United States Patent [19]

Miller et al.

[11] 4,255,378

[45] Mar. 10, 1981

[54] BENDING PLASTIC PIPE

[76] Inventors: Lee A. Miller, 15104 Hill Dr., Novelty, Ohio 44072; John S. Curtis, 6435 Gates Mills Blvd., Mayfield Heights, Ohio 44124

[21] Appl. No.: 26,412

[22] Filed: Apr. 2, 1979

Related U.S. Application Data

[62] Division of Ser. No. 841,714, Oct. 13, 1977, Pat. No. 4,156,588.

[51] Int. Cl.³ .............................................. B29C 17/02
[52] U.S. Cl. .................................... 264/322; 264/339
[58] Field of Search ............... 144/254; 264/339, 320, 264/322; 269/37, 45, 104, 81; 29/423

[56] References Cited

U.S. PATENT DOCUMENTS

| | | | |
|---|---|---|---|
| 2,389,038 | 11/1945 | German | 264/339 |
| 2,714,916 | 8/1955 | Green | 269/104 |
| 3,546,917 | 12/1970 | Paine | 29/423 |
| 3,776,539 | 12/1973 | Curtis et al. | 269/45 |
| 3,879,026 | 4/1976 | Lappin | 144/254 |

*Primary Examiner*—James B. Lowe
*Attorney, Agent, or Firm*—Maky, Renner, Otto &Boisselle

[57] ABSTRACT

A process and jig for field bending relatively large diameter plastic pipe, the jig being to guide the pipe at the point of tangency adjacent the bend after the pipe is heated and bent to form a smooth curvature to the desired radius and degree of bend as determined by the jig. The jig includes a two-piece spreader tube and a right and left hand guide, each adjustable in width, angle and spacing. The guides are U-shape and extend beneath the spreader tube so that the pipe may be placed on a flat horizontal surface. Each guide is provided with a protractor, one of which includes an offset scale so that offsets or curves with generally parallel tangents may be formed. The spreader tube includes a scale to ascertain the chord in terms of the radius for given degrees of bend.

6 Claims, 8 Drawing Figures

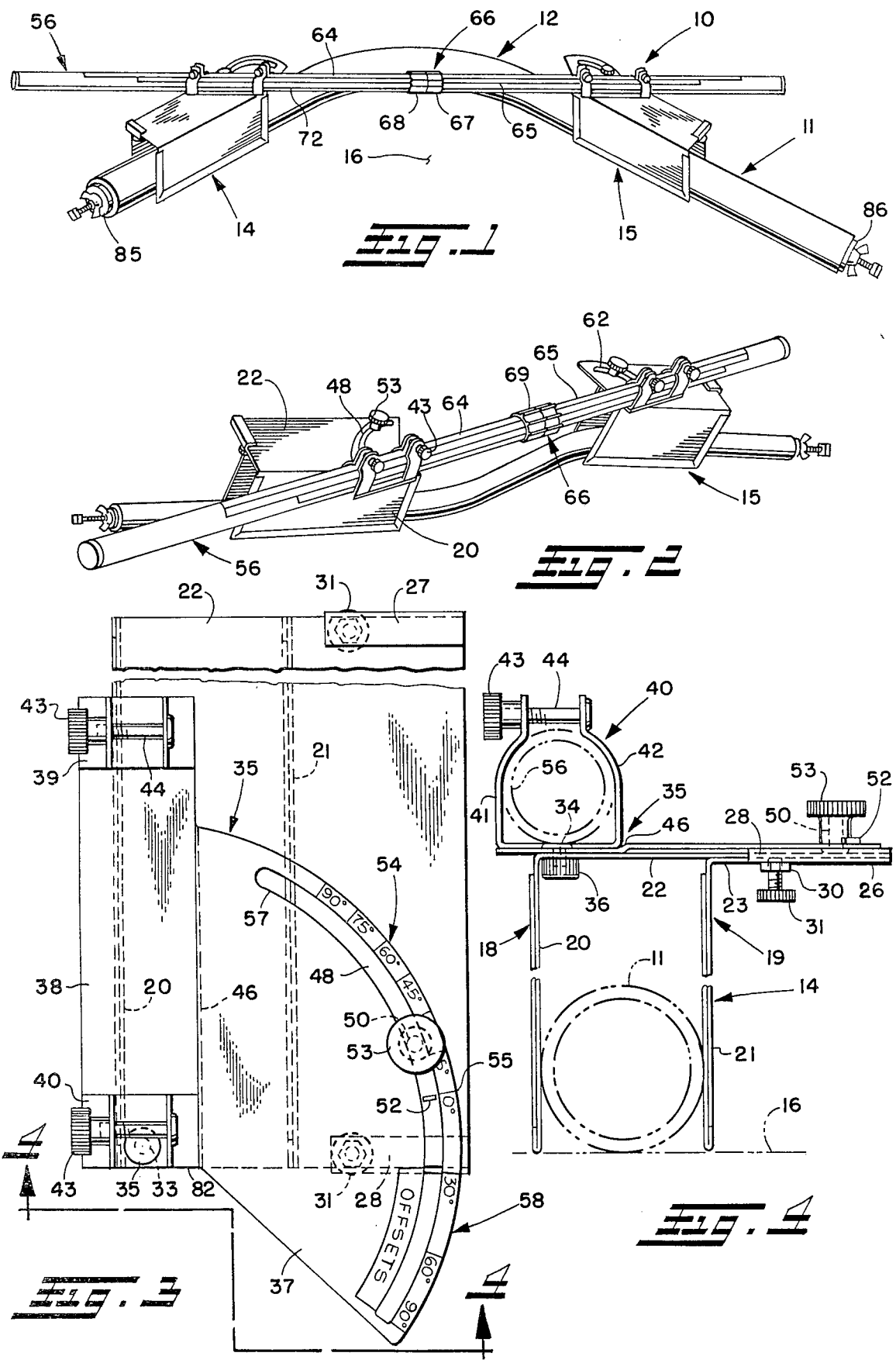

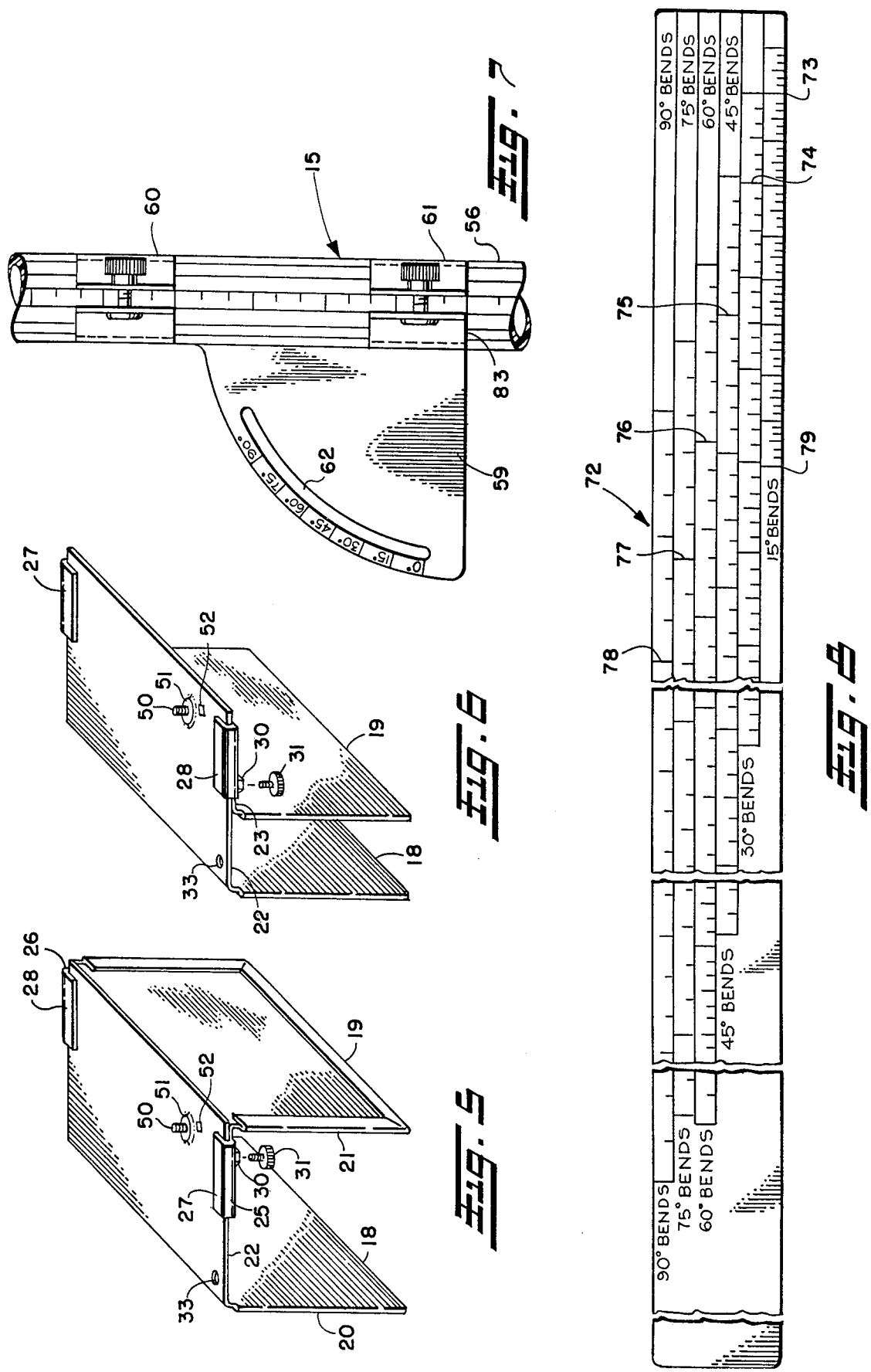

BENDING PLASTIC PIPE

This is a division of application Ser. No. 841,714, filed Oct. 13, 1977 now U.S. Pat. No. 4,156,588.

BACKGROUND OF THE INVENTION

This invention relates generally as indicated to a process and jig for field forming relatively large diameter plastic pipe or conduit. The invention of this application represents certain improvements in plastic pipe bending jigs of the type shown in applicants' prior U.S. Pat. No. 3,776,539 issued Dec. 4, 1973.

In applicants' above noted prior patent, there is illustrated several forms of a plastic pipe bending jig, at least one of which has proven useful in the field forming of relatively small diameter plastic pipe or tube. Since plastic pipe must be heated to be bent, and since heated plastic pipe is generally like wet spaghetti, it is important that the pipe or tube, particularly when of a larger diameter, be placed and maintained on a substantially flat and dry surface. Even the slightest irregularity can cause an undesired deformation in the pipe or tube to be bent. For large size conduit in the range of from about 2 to about 6 inches in diameter, such conduit, especially when heated, is difficult to support, carry or transport. It is thus easier to provide a jig which includes guides which may be positioned over the pipe. It is accordingly important that the jig be of light weight and yet sturdy construction. Moreover, it should be readily capable of being assembled in the field, and when assembled readily adjustable to form the desired bend in the particular size conduit involved.

The jig of the present invention provides a two-piece spreader tube and a right and left hand linear guide, each guide being adjustable in width. The angle of the guide and the spacing of such guides on the spreader tube is readily determinable and capable of selection. Each guide is readily adjustable in width to accommodate the conduit diameters noted above and each guide is provided with a protractor readily clamped to the spreader tube, the protractor of one guide including an offset scale so that offsets or curves with generally parallel tangents may be formed. The spreader tube includes a scale to ascertain the chord of the curve in terms of the radius for given degrees of bend.

The spreader tube may be disassembled and the guides disassembled from the spreader tube so that the components of the bending jig may be placed in a compact fashion as a kit in a carrying box.

It is a principal object of the present invention to provide a jig for the field bending of relatively large diameter plastic conduit which may be assembled and disassembled to form a readily transportable and lightweight kit.

Another principal object is the provision of a field kit for the formation of bends in plastic pipe which includes two linear guides mounted beneath a spreader bar with the width of the guides being readily adjustable through a substantial range.

Another important object is the provision of such jig for bending relatively large diameter plastic pipe wherein the guides are pivoted each to a protractor in turn clamped to the spreader tube so that the angular inclination of the guide with respect to the tube may readily be set.

Yet another important object is the provision of such jig wherein the spreader tube includes a scale by which the spacing of the guides may be obtained, such scale setting the chord of the bend in terms of the radius for certain given degrees of bend.

Another object is the provision of a lightweight easily assembled jig for the field bending of plastic pipe.

Still another object is the provision of a method for field forming bends in plastic pipe which includes the steps of placing first one set linear guide over the pipe and then the other after the pipe is brought to the desired degree of curvature on a flat surface.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

BRIEF DESCRIPTION OF THE DRAWINGS

In said annexed drawings:

FIG. 1 is a perspective view of the jig of the present invention confining a plastic conduit in turn supported on a flat surface;

FIG. 2 is a view similar to FIG. 1 illustrating the jig employed to form offsets in the conduit;

FIG. 3 is an enlarged top plan view of the left hand guide as seen in FIGS. 1 and 2;

FIG. 4 is an end elevation of such guide as seen from the line 4—4 of FIG. 3;

FIG. 5 is an isometric view of the two L-shape components interconnected with the top horizontal legs thereof extending toward each other to accommodate larger size conduits;

FIG. 6 is a view similar to FIG. 5 illustrating the components assembled with the horizontal legs thereof extending in the same direction to accommodate conduits of smaller size;

FIG. 7 is a top plan view of the protractor of the right hand guide in FIGS. 1 and 2 clamped to the spreader tube; and FIG. 8 is a broken illustration of the label or decal placed on each section of the spreader tube to convert the radius to the chord for the indicated given degrees of bend.

DESCRIPTION OF THE PREFERRED EMBODIMENTS

Referring now to FIG. 1, there is illustrated a jig 10 in accordance with the present invention confining plastic conduit 11 to form the curvature 12 therein.

The jig comprises left and right hand guide assemblies indicated at 14 and 15 which are adjustable width inverted U-shape linear guides which closely conform to the O.D. of the conduit 11 and confine the same at the point of tangency of the curvature 12. Both the jig and the conduit are supported on a flat surface 16 while the conduit, heated to form the bend, cools and rigidifies.

Each guide assembly comprises L-shape guide sections 18 and 19, each of which includes vertical legs seen at 20 and 21, respectively, as seen more clearly in FIGS. 4, 5 and 6. Each also includes a horizontal top leg as seen at 22 and 23, respectively. The top leg of the section 19 is somewhat shorter and is provided with edge flanges 25 and 26 which terminate in horizontal flanges 27 and 28 forming, with the top leg 23, channel shape guides closely accommodating the edges of the top leg 22 of the section 18.

Each channel thus formed is provided with a tapped aperture and a weld nut indicated at 30 so that thumb screws seen at 31 may be employed to clamp the two horizontal legs of the guide sections together to preclude relative movement once the width setting desired is obtained.

As seen in FIG. 5, the two guide sections may be assembled with the horizontal legs directed toward each other to obtain width settings of, for example, 5 to 6 inch conduit, while in FIG. 6 they may be assembled with the horizontal legs in the same direction for width settings of, for example, 2 to 4 inch conduit. As seen in FIGS. 3-6, the top leg 22 of the section 18 is provided with an aperture 33 through which the threaded stud 34 of protractor 35 projects. The stud may be secured to the horizontal wall 22 by means of a nut 36. The nut 36 is preferably permanently fixed in place with insufficient clamping pressure to preclude the protractor 35 from pivoting with respect to the horizontal wall 22 of the section 18 about the axis of the stud 34.

The protractor 35 comprises a horizontal plate 37 which includes a rectangular elongated portion 38 supporting upwardly projecting spreader tube clamps 39 and 40, each of which include upwardly extending spring fingers 41 and 42 which are pulled together by the thumb screw 43 on stud 44 which extends between the distal ends of the fingers.

The major part of the plate 37 is upwardly offset as indicated at 46 to provide a clearance for the top flanges 27 and 28 of the channel guides for the L-shape section 19. The upwardly offset portion of the plate is formed into a circular segment, the radius of the circle being struck from the center of the stud 34. An arcuate slot 48 is provided in the plate and has the same center.

As seen perhaps more clearly in FIG. 5, a stud 50 projects upwardly from the horizontal leg 22 of the L-shape section 18, such stud projecting from a dimpled or offset portion of the horizontal leg as indicated at 51. This provides clearance for the head of the stud beneath the leg to permit the horizontal leg 23 to slide therebeneath. The dimple also provides a clamping abutment. An index tab 52 also projects upwardly from the top surface of leg 22. Both the stud and the index tab project through and are within the arcuate slot 48. A shouldered thumb nut 53 is provided on the stud 50 and is employed to clamp the protractor and the horizontal leg 22 of the section 18 together in the desired angular relationship as determined by the index tab 52 which is used to read the scale 54 on the protractor adjacent the slot 48. Such scale includes a 0° indicia as indicated at 55. When the marker is on the 0° indicia as indicated, the guide 14 is parallel to the spreader tube 56 passing through the clamps 39 and 40. On one side of the 0° indicia, the scale includes six markings indicating 15°, 30°, 45°, 60°, 75° and 90°, such markings extending over a 45° span of the arc of the slot. The slot extends beyond the 90° indicia as indicated at 57 to accommodate the stud 50 when the marker or tab 52 is opposite the 90° index mark.

On the opposite side of the 0° mark 55, the scale is divided equally in three increments with the 30°, 60° and 90° indicia as shown. In this manner the left hand guide may be pivoted 45° on either side of a position parallel to the spreader bar 56. The portion of the scale including the 0°, 15°, 30°, 45°, 60°, 75° and 90° marks is used for forming bends as seen in FIG. 1 while the scale on the opposite side of 0° indicated at 58 is used for forming offsets as seen in FIG. 2. The protractor for the right hand guide 15, as seen in FIG. 7, includes a plate 59 slidably clamped to the spreader tube 56 by the clamps 60 and 61 and includes the arcuate slot 62 which has the 0°-90° scale over 45° but does not include the offset scale as in the left hand protractor. The construction of the right hand guide, aside from the right handedness of the L-shape sections and the protractor plate, is the same as for the left hand guide seen in detail in FIGS. 3 and 4.

Referring again to FIGS. 1 and 2, it will be seen that the spreader tube 56 includes two equal length parts 64 and 65 which are interconnected by the threaded coupling shown generally at 66. Such coupling may comprise a fixed plastic element 67 on the end of the spreader tube right hand section 65 which includes a projecting male threaded element. A similar plastic female threaded element 68 is rotatably mounted on the end of the left hand spreader tube section 64 so that the sections may readily be assembled and disassembled. The plastic fittings are provided with ridges as seen at 69 in FIG. 2 readily to permit the sections to be assembled and tightened and then disassembled. Since the sections are each over 40 inches long, the disassembly permits the packing of the individual sections in a much shorter kit for storage and transportation. The guides 14 and 15 can, of course, be readily assembled and disassembled on the spreader tube by means of the clamps shown.

Referring now to FIG. 8, each spreader tube section is provided with a scale which may be applied as an adhesive decal, the scale for the left hand spreader tube section 64 being shown foreshortened at 72 in FIG. 8. The scale on the right hand spreader tube section 65 will be symmetrically reversed in form. Each scale actually comprises six different parallel scales, there being one scale for each of the increments on each protractor at 15°, 30°, 45°, 60°, 75° and 90°. Each scale expresses for its selected degrees of bend the radius of curvature as the sine of one half the angle of curvature. For example, the 18 inch mark on the respective scales reading from 15° to 90° is indicated at 73°, 74°, 75°, 76°, 77° and 78°, respectively. The 15° bend scale may extend from 18 inches to 72 inches, the 72 inch marker being indicated at 79. Thus each large marker represents an increment of 6 inches. The 30° bend scale may extend from 12 inches to 72 inches, each large marker again representing an increment of 6 inches. The 45° bend scale may extend from 12 inches to 72 inches. The 60° bend scale may extend from 12 inches to 66 inches. The 75° bend scale may extend from 12 inches to 54 inches, while the 90° bend scale extends from 12 inches to 48 inches. In any event, the scale is to be read as the selected radius of curvature from the inside of the conduit or pipe 11 while it actually represents one half the chord.

In operation the two-piece spreader tube may be removed from its carrying case and the threaded fitting 66 engaged so that the two sections of the spreader tube are clamped together. The two sections should be connected so that the printed scales thereon are facing the operator. The left and right hand guides are inserted on the respective ends of the spreader tube as assembled and they may be spread therealong to any desired position. The jig is then ready to preset for any radius and any segment of bend.

To set the jig for the selected bend, the inside radius and the degrees of bend required should be determined and this can be obtained from Table 346-10, of the National Electric Code for Minimum Radius.

The L-shape sections of the guides are then adjusted and locked as seen in FIGS. 5 and 6 for the size conduit to be formed. A close fit over the conduit is important.

Next the user sets and locks the degrees of bend on both the left and right hand conduit guide protractors. For example, both may be set and locked at 45°. The operator then selects the correct "degrees of bend" scale on the spreader tube. The operator then slides the left and right conduit guides to the desired inside radius as read on the selected scale. The edge indicated at 82 in FIG. 3 and 83 in FIG. 7 may be used to line up the guide with the appropriate inside radius index line on the selected scale for the selected angle of bend. The locking knobs or clamp nuts 43 are now tightened to secure the guides at the proper position.

Now, to form the bend, the ends of the pipe or conduit section to be formed may be provided with expansible plugs as seen at 85 and 86 in FIG. 1, and the conduit then placed in a heater which uniformly heats the section desired to be bent. The plugs serve to trap air inside the conduit to prevent the wall from buckling upon formation of the curve. The heater air within the interior of the conduit creates a pressure for this purpose.

The plugged heated conduit is then removed from the heater and placed on the dry flat surface 16. The jig is then picked up as though one were lifting a barbell and lowered over the conduit so that one conduit guide slides over the conduit at the point where the bend is to begin. For example, the right hand guide 15 may initially be placed over the heated conduit. The operator may then pull the free end of the heated conduit to form a smooth curve and lift the empty conduit guide section 14 using the end of the spreader tube as a handle to place the same over the now formed conduit. The bend may now be set by sponging with cold water.

To form offsets such as seen in FIG. 2, the left hand conduit guide may be set at the desired 30°, 60° or 90° indication on the offset scale 58. The right hand conduit guide may be set on its scale on the same degree of bend so that the conduit guides are parallel. The desired distance of the offset can now be obtained by adjusting the distance between the conduit guides. The curvature and dimension of the offset can be varied by the use of different degree settings of the protractors and the distance between the conduit guides. The scale on the spreader tube does not apply when forming offsets. To form the offset, the steps of forming the bend described above are repeated.

The jig for accomplishing the bending steps outlined above is quite sturdy yet relatively lightweight. For example, the protractor and the L-shape sections of each guide may be formed of 18 gauge steel and the edges of the L-shape sections may be folded and flattened as indicated. Preferably the parts are plated. The various elements of the jig may readily be assembled and disassembled for storage and transportation.

Other modes of applying the principles of the invention may be employed, change being made as regards the details described, provided the features stated in any of the following claims or the equivalent of such be employed.

We, therefore, particularly point out and distinctly claim as our invention:

1. A method of field forming a bend of a selected angle of curvature and a selected radius of curvature in plastic pipe, comprising: the steps of setting a jig which includes two interconnected linear inverted U-shape guides slidably mounted upon and angularly positionable with respect to an elongated support, said step of setting the jig including setting the guides to the proper width to conform to the O.D. of the pipe, slidably setting the guides the proper distance apart along the elongated support by selecting a proper scale corresponding to such selected angle of curvature from a plurality of axially parallel subscales on the elongated support corresponding respectively to different angular settings and slidably moving the guides along the elongated support to a position identified on such proper scale for such selected radius of curvature, and angularly setting the guides at a proper angular position with respect to the elongated support by using a protractor at each guide to determine the proper angular position of the guides with respect to the elongated support and rotating the guide to such thusly determined angular position; plugging the ends of the pipe to be bent; heating the pipe in the area of the bend; placing the pipe on a flat surface; lowering one of the guides over the pipe at the point where the bend is to begin; moving the free end of the pipe to form a smooth curve; and then placing the other guide over the pipe.

2. A method as set forth in claim 1, including the step of locking the guides into their proper angular positions, and locking them into their proper locations along the elongated support and the scale, prior to placing the guides over the pipe.

3. A method as set forth in claim 1, wherein said parallel subscales each consist of two scales, one the mirror image of the other, each of which is associated with, and is used with, a single one of said two guides.

4. A method as set forth in claim 1, including the step of sponging the pipe with cold water to set the bend.

5. A method as set forth in claim 4, including removing the guides and then removing the plugs after the bend is set.

6. A method as set forth in claim 5, including the step of using the elongated support as a handle to lower said one of said guides and then to place the other of said guides after said free end of the pipe has been moved to form the bend.

* * * * *